J. SPEAR.

Base-Burning Stoves.

No. 5,460. Reissued June 17, 1873.

Witnesses
J. Wedthaquer
T. A. Connolly

Inventor:
James Spear
per Edw. F. Brown
Attorney

AM. PHOTO-LITHOGRAPHIC CO. N.Y. (OSBORNE'S PROCESS.)

UNITED STATES PATENT OFFICE.

JAMES SPEAR, OF PHILADELPHIA, PENNSYLVANIA.

IMPROVEMENT IN BASE-BURNING STOVES.

Specification forming part of Letters Patent No. 100,335, dated March 1, 1870; reissue No. 5,460, dated June 17, 1873; application filed March 10, 1873.

DIVISION B.

*To all whom it may concern:*

Be it known that I, JAMES SPEAR, of Philadelphia, in the State of Pennsylvania, have invented certain Improvements in Stoves and Heaters, of which the following is a specification:

The nature of my invention consists in the mode of suspending a grate below the lower or discharge end of a fire-pot, so that a space is left between the grate and fire-pot, for the removal of slate and clinkers over the periphery of the said grate, and between it and the wall of the stove. This I accomplish by means of arms secured to the fire-pot and projecting downward below the discharge end thereof. The lower ends of these arms have lips which project beneath the periphery of the grate, so as to support the grate in the position shown, relative to that of the fire-pot, and at the same time to admit of a vibratory motion being given to the grate.

Figure 1:
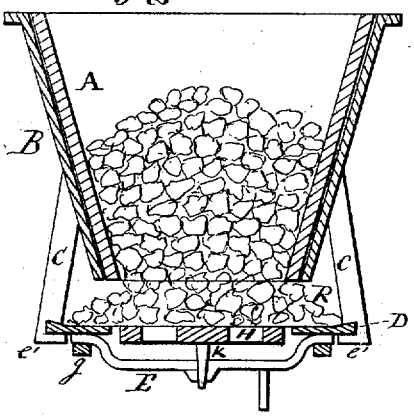
Figure 2:
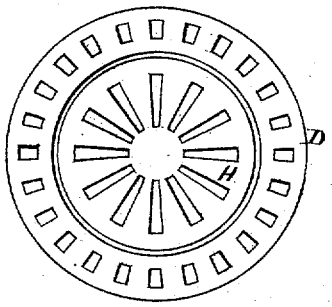
Figure 3:
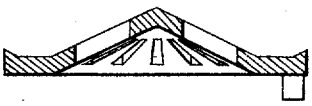

Figure 1 is a vertical section through the fire-pot and grate. Fig. 2 is a plan of the grate. Fig. 3 is a section through a grate having a raised center.

A is a fire-clay pot within the iron cylinder B. To the iron cylinder B are attached arms C projecting downward. The lower ends of these arms have lips *e'* projecting beneath the ring D, forming part of the grate-surface. This ring carries a bar, E, on its under side, pivoted in bearings *g*. The central portion H of the grate-surface turns upon a center-pivot, K, supported by the cross-bar E. This arrangement permits of the ring D and grate H being shaken separately, and the grate H dumped.

It is evident that the grate H and ring D may be cast in one piece, so that both will shake together, in which case all the slate and clinkers too large to pass through the grate will be removed through the opening R formed between the grate and the discharge end of the fire-pot, as shown in Fig. 1. The grate-surface is larger than the discharge end of the fire-pot, so as to prevent the coals falling from the fire-pot over the periphery of the grate, except when the grate is shaken.

It is evident that in the application of my invention a grated or open fire-pot for emitting light may be substituted for the closed or solid fire-pot herein shown.

The draft passes to the fire through the grate and the opening R.

I claim—

A vibrating grate supported at a distance below the discharge end of the fire-pot sufficient for the removal of slate and clinkers over its periphery, as herein described, by means of arms C projecting downward from the fire-pot or cylinder, substantially as herein described.

JAMES SPEAR.

Witnesses:
EDW. BROWN,
JOHN F. GRANT.